(12) United States Patent
Chiang et al.

(10) Patent No.: US 12,284,582 B2
(45) Date of Patent: Apr. 22, 2025

(54) INAUDIBLY NOTIFYING A CALLER OF A STATUS OF AN OPEN-LINE CALL

(71) Applicant: T-Mobile USA, Inc., Bellevue, WA (US)

(72) Inventors: Hsin-Fu Henry Chiang, Bellevue, WA (US); William Michael Hooker, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 410 days.

(21) Appl. No.: 17/695,642

(22) Filed: Mar. 15, 2022

(65) Prior Publication Data
US 2023/0300589 A1    Sep. 21, 2023

(51) Int. Cl.
| | | |
|---|---|---|
| H04M 11/04 | (2006.01) | |
| G08B 6/00 | (2006.01) | |
| H04M 3/51 | (2006.01) | |
| H04W 4/029 | (2018.01) | |
| H04W 4/12 | (2009.01) | |
| H04W 4/90 | (2018.01) | |
| H04W 76/11 | (2018.01) | |

(52) U.S. Cl.
CPC .............. *H04W 4/90* (2018.02); *G08B 6/00* (2013.01); *H04M 3/5116* (2013.01); *H04W 4/029* (2018.02); *H04W 4/12* (2013.01); *H04W 76/11* (2018.02)

(58) Field of Classification Search
CPC ......... H04W 4/90; H04W 4/029; H04W 4/12; H04W 76/11; G08B 6/00; G08B 15/001; G08B 25/016; H04M 11/04; H04M 3/5116; H04M 7/006; H04M 2242/30; H04M 3/42093
See application file for complete search history.

(56) References Cited

U.S. PATENT DOCUMENTS

| | | | |
|---|---|---|---|
| 6,701,162 B1 * | 3/2004 | Everett | H04M 1/72478 |
| | | | 704/235 |
| 6,757,274 B1 | 6/2004 | Bedingfield et al. | |
| 6,836,797 B2 | 12/2004 | Givoly et al. | |
| 6,870,848 B1 | 3/2005 | Prokop | |
| 6,957,255 B1 | 10/2005 | Schweitzer et al. | |

(Continued)

FOREIGN PATENT DOCUMENTS

| | | |
|---|---|---|
| CN | 103078853 A | 5/2013 |
| CN | 111181896 A | 5/2020 |

(Continued)

*Primary Examiner* — Stephen M D Agosta
(74) *Attorney, Agent, or Firm* — Perkins Coie LLP

(57) ABSTRACT

The system receives a SIP call from a UE associated with a user, where the SIP call includes multiple fields, and where a field among the multiple fields indicates that the SIP call is the open-line call. The system receives a first indication that the UE associated with a callee has generated a notification to the callee of the SIP call. Upon identifying the SIP call as the open-line call and receiving the first indication, the system sends a first message to the UE associated with the caller that the UE associated with the callee has generated the notification. The first message indicates to the UE associated with the caller to generate a first inaudible notification indicating that the UE associated with the callee generated the notification.

18 Claims, 9 Drawing Sheets

(56) References Cited

U.S. PATENT DOCUMENTS

| | | | |
|---|---|---|---|
| 7,020,130 | B2 | 3/2006 | Krause et al. |
| 7,092,385 | B2 | 8/2006 | Gallant et al. |
| 7,149,506 | B2 | 12/2006 | Osterhout et al. |
| 7,154,864 | B2 | 12/2006 | Costa-requena et al. |
| 7,251,254 | B2 | 7/2007 | Bond et al. |
| 7,283,506 | B2 | 10/2007 | Mayer et al. |
| 7,315,742 | B2 | 1/2008 | Creamer et al. |
| 7,330,483 | B1 | 2/2008 | Peters et al. |
| 7,363,381 | B2 | 4/2008 | Mussman et al. |
| 7,366,136 | B1 | 4/2008 | Kalbag et al. |
| 7,412,529 | B2 | 8/2008 | Ryu |
| 7,467,210 | B1 | 12/2008 | Rao et al. |
| 7,508,923 | B1 | 3/2009 | Samaarasinghe |
| 7,653,191 | B1 | 1/2010 | Glasser et al. |
| 7,668,159 | B2 | 2/2010 | Buckley et al. |
| 7,710,950 | B2 | 5/2010 | Buckley et al. |
| 7,738,644 | B2 | 6/2010 | Brannick et al. |
| 7,751,316 | B2 | 7/2010 | Yarlagadda et al. |
| 7,751,359 | B1 | 7/2010 | Bienn et al. |
| 7,773,584 | B2 | 8/2010 | Gorti et al. |
| 7,802,202 | B2 * | 9/2010 | Fox .................. G06F 3/038 715/861 |
| 7,804,949 | B2 | 9/2010 | Wengrovitz |
| 7,826,868 | B2 | 11/2010 | Robbins et al. |
| 7,920,547 | B2 | 4/2011 | Lim |
| 7,995,560 | B2 | 8/2011 | Kucmerowski et al. |
| 7,995,561 | B2 | 8/2011 | Li et al. |
| 7,995,730 | B1 | 8/2011 | Zhang et al. |
| 8,041,331 | B2 | 10/2011 | Sokondar |
| 8,046,470 | B2 | 10/2011 | Lewis et al. |
| 8,077,675 | B2 | 12/2011 | Stephenson et al. |
| 8,082,580 | B1 | 12/2011 | Desai et al. |
| 8,085,757 | B2 | 12/2011 | Ku et al. |
| 8,098,651 | B1 | 1/2012 | Ramsayer et al. |
| 8,102,839 | B2 | 1/2012 | Kuusinen et al. |
| 8,135,124 | B2 | 3/2012 | Ramanathan et al. |
| 8,139,604 | B2 | 3/2012 | Yeom |
| 8,155,294 | B2 | 4/2012 | Raghav et al. |
| 8,180,036 | B2 | 5/2012 | Plas et al. |
| 8,199,763 | B2 | 6/2012 | Sheridan et al. |
| 8,208,413 | B1 | 6/2012 | Bienn et al. |
| 8,223,757 | B2 | 7/2012 | Jackson et al. |
| 8,296,448 | B2 | 10/2012 | Ait-ameur et al. |
| 8,332,481 | B2 | 12/2012 | Sheth et al. |
| 8,351,461 | B2 | 1/2013 | Duffy et al. |
| 8,358,650 | B2 | 1/2013 | Benedyk et al. |
| 8,363,640 | B2 | 1/2013 | Yasrebi et al. |
| 8,369,311 | B1 | 2/2013 | Kirchhoff et al. |
| 8,401,154 | B2 * | 3/2013 | Boni .................. H04W 76/50 379/85 |
| 8,417,832 | B2 | 4/2013 | Abrahams et al. |
| 8,477,761 | B2 | 7/2013 | Prasad et al. |
| 8,499,082 | B2 | 7/2013 | Roach et al. |
| 8,601,561 | B1 * | 12/2013 | Cleron .............. G06F 3/04886 726/7 |
| 8,638,923 | B1 | 1/2014 | Zhang et al. |
| 8,644,218 | B1 | 2/2014 | Pankajakshan et al. |
| 8,730,294 | B2 | 5/2014 | Benzaia et al. |
| 8,774,174 | B2 | 7/2014 | James et al. |
| 8,780,888 | B2 | 7/2014 | Bian et al. |
| 8,788,704 | B1 | 7/2014 | Chen et al. |
| 8,831,648 | B2 | 9/2014 | Bantukul |
| 8,873,405 | B2 | 10/2014 | Newman |
| 8,874,765 | B2 | 10/2014 | Kumarasamy et al. |
| 8,879,544 | B1 | 11/2014 | Rathnam et al. |
| 8,913,493 | B2 | 12/2014 | Haltom |
| 8,984,067 | B2 | 3/2015 | Lau et al. |
| 9,036,619 | B2 | 5/2015 | Rigaldies et al. |
| 9,071,684 | B2 | 6/2015 | Byron et al. |
| 9,148,396 | B2 * | 9/2015 | Sennett ............ H04M 1/72436 |
| 9,178,778 | B2 | 11/2015 | Meloche et al. |
| 9,185,139 | B2 | 11/2015 | Holbrook et al. |
| 9,282,156 | B2 | 3/2016 | Holley et al. |
| 9,344,564 | B2 | 5/2016 | Torres et al. |
| 9,369,500 | B2 | 6/2016 | Sandblad et al. |
| 9,571,651 | B2 | 2/2017 | Hp et al. |
| 9,584,553 | B2 | 2/2017 | Swaminathan et al. |
| 9,614,974 | B1 | 4/2017 | Hodge et al. |
| 9,621,715 | B2 | 4/2017 | Lacroix |
| 9,706,045 | B2 | 7/2017 | Allen et al. |
| 9,712,341 | B2 | 7/2017 | Nas |
| 9,717,101 | B1 * | 7/2017 | Burnham .............. G16H 80/00 |
| 9,781,063 | B2 * | 10/2017 | Crawford ............ H04L 51/046 |
| 9,826,287 | B2 | 11/2017 | Soo et al. |
| 9,871,916 | B2 | 1/2018 | Dingler et al. |
| 9,900,351 | B2 | 2/2018 | Taylor |
| 9,907,096 | B2 | 2/2018 | Biage et al. |
| 9,959,747 | B1 * | 5/2018 | Zupan .................. G10L 25/18 |
| 9,961,521 | B2 | 5/2018 | Lee et al. |
| 9,967,129 | B1 | 5/2018 | Katapadi et al. |
| 10,169,972 | B1 * | 1/2019 | Long ............... G08B 21/0423 |
| 10,341,396 | B2 | 7/2019 | Kumar Selvaraj |
| 10,347,117 | B1 * | 7/2019 | Capurro .............. G08B 25/10 |
| 10,404,858 | B1 * | 9/2019 | Hoelzle ............ H04L 65/1069 |
| 10,516,778 | B2 * | 12/2019 | Kumar Selvaraj .................... H04L 65/1104 |
| 10,582,035 | B1 * | 3/2020 | Chiang ................. H04W 4/90 |
| 10,798,134 | B2 * | 10/2020 | Sinha ................ H04L 65/1104 |
| 11,070,675 | B1 | 7/2021 | Ruiz et al. |
| 11,095,664 | B2 | 8/2021 | Lu et al. |
| 2004/0008191 | A1 * | 1/2004 | Poupyrev ............ G06F 3/0487 345/184 |
| 2004/0204020 | A1 | 10/2004 | Kuramitsu |
| 2004/0213150 | A1 | 10/2004 | Krause et al. |
| 2005/0013419 | A1 * | 1/2005 | Pelaez .................. H04W 4/18 379/88.14 |
| 2005/0058075 | A1 * | 3/2005 | Gorday ................ H04W 4/16 370/241 |
| 2005/0170829 | A1 | 8/2005 | Seo |
| 2005/0175032 | A1 | 8/2005 | Yeom |
| 2005/0255811 | A1 | 11/2005 | Allen et al. |
| 2006/0256721 | A1 | 11/2006 | Yarlagadda et al. |
| 2007/0064886 | A1 | 3/2007 | Chiu et al. |
| 2007/0116189 | A1 * | 5/2007 | Clawson .............. H04M 11/04 379/37 |
| 2007/0143858 | A1 | 6/2007 | Hearty |
| 2007/0243858 | A1 | 10/2007 | Marathe et al. |
| 2007/0270104 | A1 | 11/2007 | Allen et al. |
| 2007/0286160 | A1 | 12/2007 | Gorti et al. |
| 2007/0286361 | A1 | 12/2007 | West et al. |
| 2007/0288600 | A1 | 12/2007 | Arabi et al. |
| 2008/0126535 | A1 | 5/2008 | Zhu et al. |
| 2008/0137529 | A1 | 6/2008 | Sheikh et al. |
| 2008/0284587 | A1 * | 11/2008 | Saigh ................ H04M 1/72424 340/539.13 |
| 2008/0303660 | A1 * | 12/2008 | Lombardi ............ G08G 1/0965 340/540 |
| 2009/0041223 | A1 | 2/2009 | Agarwal et al. |
| 2009/0052785 | A1 * | 2/2009 | Shamaie .............. G06F 3/0488 382/209 |
| 2009/0103457 | A1 | 4/2009 | Mamakos |
| 2009/0113063 | A1 | 4/2009 | Yeh |
| 2009/0135731 | A1 | 5/2009 | Secades et al. |
| 2009/0168985 | A1 | 7/2009 | Yu et al. |
| 2009/0225670 | A1 | 9/2009 | Leung et al. |
| 2009/0268606 | A1 | 10/2009 | Delew et al. |
| 2009/0298475 | A1 * | 12/2009 | Czaja .................... H04W 48/04 455/412.2 |
| 2009/0316870 | A1 | 12/2009 | Wise et al. |
| 2010/0014509 | A1 | 1/2010 | Kouchri |
| 2010/0115111 | A1 | 5/2010 | Varga et al. |
| 2010/0157986 | A1 | 6/2010 | Rao et al. |
| 2010/0226339 | A1 | 9/2010 | Stephenson et al. |
| 2010/0255831 | A1 | 10/2010 | Shuman et al. |
| 2010/0297981 | A1 * | 11/2010 | Ballantyne ........ H04M 1/72418 455/404.2 |
| 2011/0075653 | A1 | 3/2011 | Potts et al. |
| 2011/0110363 | A1 | 5/2011 | Anandani |
| 2011/0167172 | A1 | 7/2011 | Roach et al. |
| 2011/0182281 | A1 | 7/2011 | Siddique et al. |
| 2012/0081501 | A1 | 4/2012 | Benzaia et al. |
| 2012/0236760 | A1 * | 9/2012 | Ionescu ............ H04L 65/1069 370/259 |

(56) References Cited

U.S. PATENT DOCUMENTS

| | | | |
|---|---|---|---|
| 2013/0194235 A1* | 8/2013 | Zanone | G06F 3/0421 |
| | | | 345/178 |
| 2013/0212478 A1* | 8/2013 | Karr | G06F 3/167 |
| | | | 715/727 |
| 2013/0250779 A1 | 9/2013 | Meloche et al. | |
| 2014/0044125 A1 | 2/2014 | Rathnam et al. | |
| 2014/0169534 A1* | 6/2014 | Bentley | G10L 25/48 |
| | | | 379/45 |
| 2014/0179260 A1* | 6/2014 | Malin | H04W 4/029 |
| | | | 455/566 |
| 2014/0254574 A1 | 9/2014 | Schreuder | |
| 2015/0271655 A1* | 9/2015 | Jatavallabhula | H04W 4/90 |
| | | | 455/404.1 |
| 2015/0281459 A1 | 10/2015 | Guo et al. | |
| 2015/0365812 A1* | 12/2015 | Marshall | H04L 65/1069 |
| | | | 709/206 |
| 2016/0373578 A1* | 12/2016 | Klaban | B60R 25/33 |
| 2017/0251031 A1 | 8/2017 | Lehesaari et al. | |
| 2018/0013889 A1* | 1/2018 | Klaban | H04M 3/42195 |
| 2018/0124238 A1 | 5/2018 | Shah et al. | |
| 2019/0200175 A1 | 6/2019 | Ylönen et al. | |
| 2019/0289047 A1 | 9/2019 | Bai et al. | |
| 2020/0045168 A1 | 2/2020 | Sinha | |
| 2020/0274964 A1* | 8/2020 | Ravichandran | H04M 3/42059 |
| 2020/0296554 A1* | 9/2020 | Chiang | H04L 65/1059 |
| 2021/0051141 A1* | 2/2021 | Duriseati | H04L 63/0884 |
| 2021/0185097 A1 | 6/2021 | Kinsey et al. | |
| 2021/0366266 A1* | 11/2021 | Owens | H04L 65/40 |
| 2021/0392173 A1 | 12/2021 | Chen et al. | |
| 2021/0400149 A1 | 12/2021 | Warrick | |
| 2022/0060877 A1* | 2/2022 | Robertson | H04W 4/90 |
| 2023/0300588 A1* | 9/2023 | Chiang | H04W 4/02 |

FOREIGN PATENT DOCUMENTS

| | | |
|---|---|---|
| CN | 110324874 B | 10/2020 |
| CN | 107317786 B | 11/2020 |
| EP | 1111892 B1 | 10/2007 |
| EP | 1874016 A1 | 1/2008 |
| EP | 1886467 A2 | 2/2008 |
| EP | 2461550 A1 | 6/2012 |
| EP | 2664169 A1 | 11/2013 |
| JP | 4620099 B2 | 11/2010 |
| WO | 2009094915 A1 | 8/2009 |
| WO | 2013020500 A1 | 2/2013 |
| WO | 2013170650 A1 | 11/2013 |
| WO | 2014154039 A2 | 10/2014 |
| WO | 2016003872 A1 | 1/2016 |
| WO | 2016075510 A1 | 5/2016 |
| WO | 2017218177 A1 | 12/2017 |

* cited by examiner

INAUDIBLY NOTIFYING A CALLER OF A STATUS OF AN OPEN-LINE CALL

BACKGROUND

A victim of an external threat, such as domestic abuse or other crime, may want to place an open-line call. An open-line call is a distress call to 911 or another help line asking for assistance. However, the victim may want to make the call without the aggressor's knowledge. The problem arises when the call is placed but the operator receiving the call may not be aware that it is an open-line call, and may audibly engage with the victim, thus worsening the already dangerous situation. Another problem is how to notify the victim of the status of the placed call, without notifying the aggressor that the victim has placed a call.

BRIEF DESCRIPTION OF THE DRAWINGS

Detailed descriptions of implementations of the present invention will be described and explained through the use of the accompanying drawings.

Figure 1:
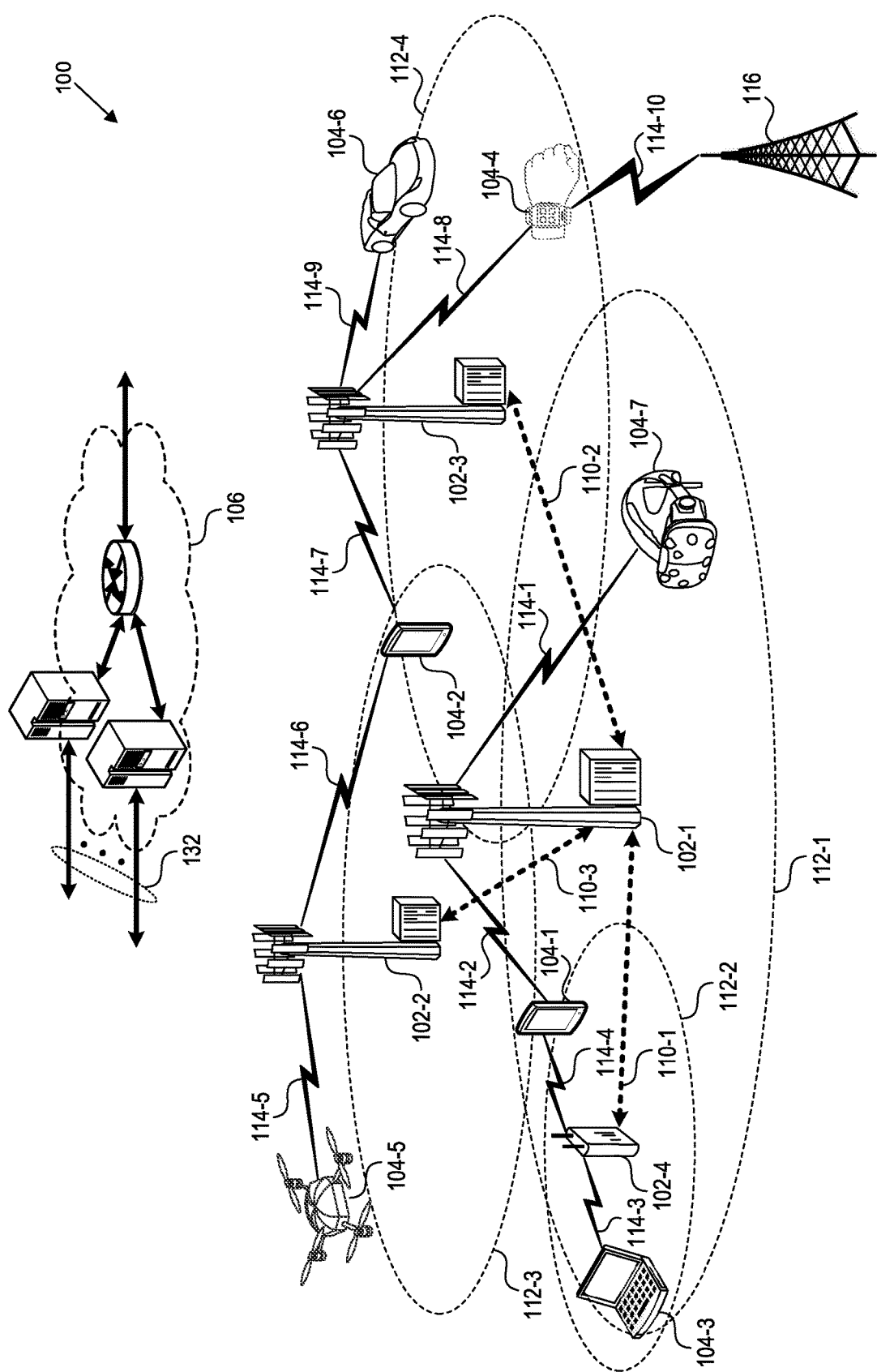
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to inaudibly notify a caller of a status of an open-line call. The open-line call means that the user of the mobile device cannot engage in a conversation with a receiver of the open-line call, due to an external threat such as domestic abuse or other crime. The system can receive a session initiation protocol (SIP) call from a mobile device associated with a user. The SIP call includes a setup phase and a data transfer phase. The setup phase precedes the data transfer phase, and includes an exchange of multiple fields. A field among the multiple fields can indicate that the SIP call is the open-line call.

The system can receive a first indication that a device associated with a callee has generated a notification to the callee of the SIP call. Upon identifying the SIP call as the open-line call and receiving the first indication, the system can send a first message to the mobile device associated with the caller that the device associated with the callee has generated the notification. The first message can indicate to the mobile device associated with the caller to generate a first inaudible notification indicating that the device associated with the callee generated the notification.

The system can receive a second indication that the callee has answered the SIP call. Upon identifying the SIP call as the open-line call and receiving the second indication, the system can send a second message to the mobile device associated with the caller that the callee has answered the SIP call. The second message indicates to the mobile device associated with the caller to generate a second inaudible notification indicating that the callee has answered the SIP call. The first inaudible notification and the second inaudible notification are different. For example, the first inaudible notification can include the mobile device vibrating once, and the second inaudible notification can include the mobile device vibrating twice.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
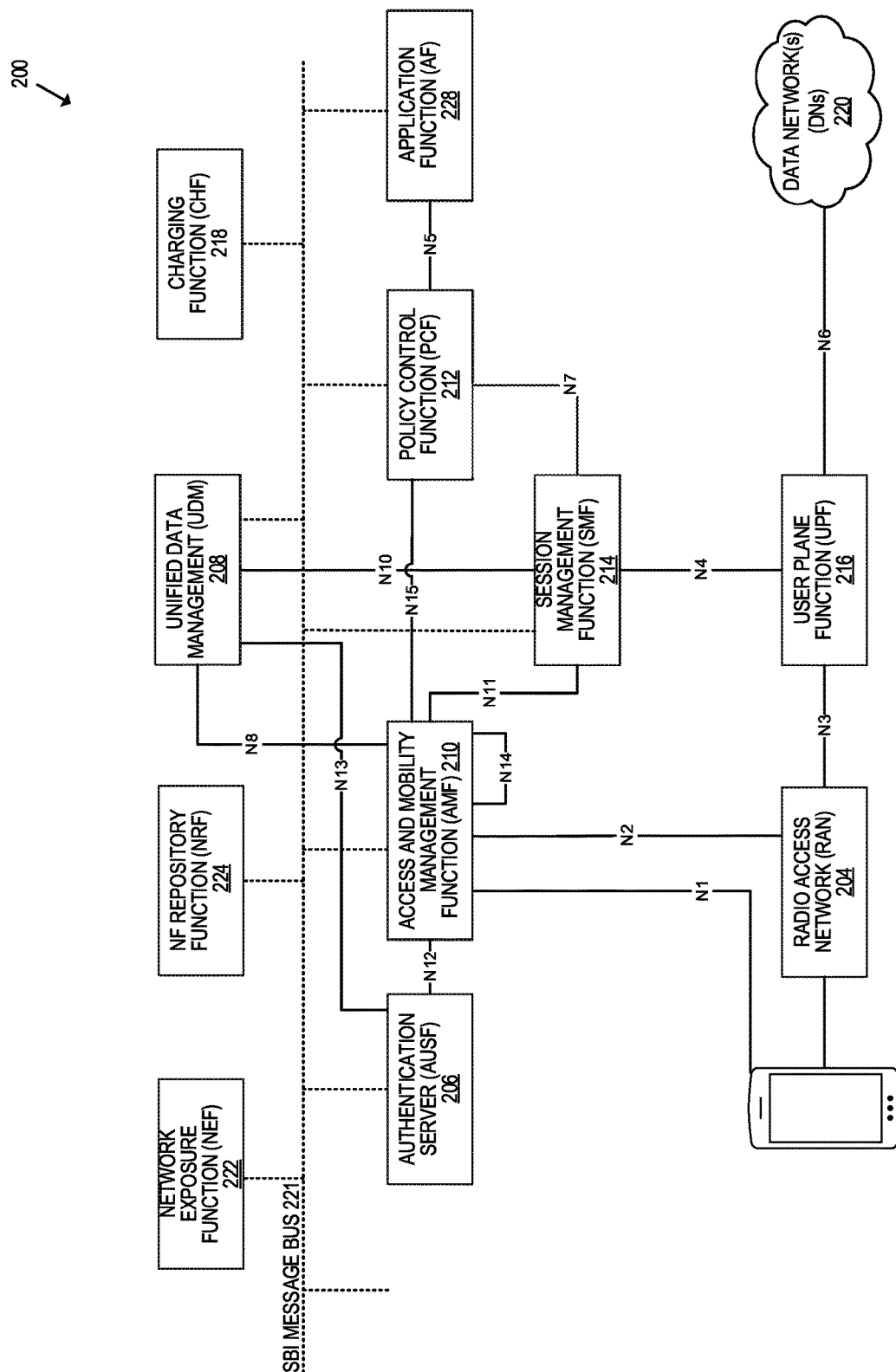
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP technical specification (TS) 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service (QOS) and charging rules, includes network slice selection, which is regulated by the NSSF 226.

Figure 3:
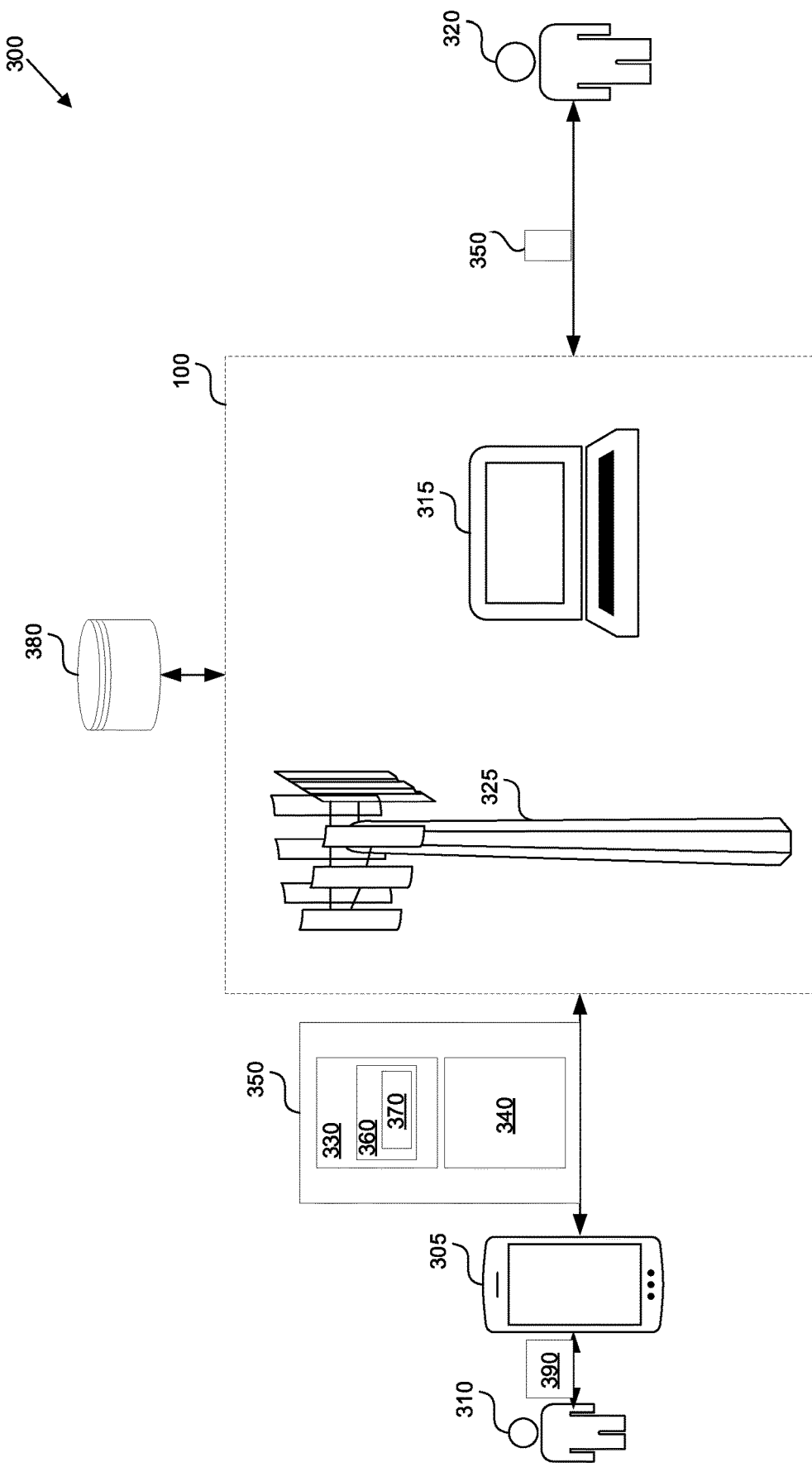
FIG. 3 shows a system to automatically identify an open-line call using an additional identity tag.

Automatically Identify a Call Associated with a Wireless Telecommunication Network as an Open-Line Call FIG. 3 shows a system to automatically identify an open-line call using an additional identity tag. In certain dangerous situations such as domestic abuse, robbery, or other criminal situations, a victim, e.g., a user 310 of the system 300, can be threatened, and need help, however the aggressor cannot know that the victim is seeking help. The operator 320 receiving the call also needs to be notified that the call is a silent call, without audibly engaging the user 310.

The system 300 enables the user 310 to make a silent call, e.g. an open-line E911-type call, using a UE 305 to an operator 320 which can indicate to the operator that the victim cannot communicate and that the operator should not audibly communicate with the victim. The system 300 can place a call 350 through a network 100. The network 100 can include cell towers 325 and devices 315 analyzing the incoming call 350. The system 300 can connect the call to the operator 320, such as an operator at a Public Service Answer Point (PSAP). The operator can also be a first responder, a computer program, or an artificial intelligence (AI) that can analyze the contents of the incoming call 350 to determine the likelihood that the incoming call is a false open-line call. False open-line calls can occur through pocket dialing, or through the UE 305 incorrectly determining that the user 310 is requesting to make the open-line call.

The UE 305 can receive a predetermined input 390 from the user 310 indicating that the UE needs to place an open-line call. The UE 305 can present a list of potential predetermined inputs to the user, and ask the user to select one or more of the predetermined inputs as indicating the open-line call. The requirements for the predetermined inputs include that the predetermined inputs are easy to dial, but are unlikely to be dialed by accident.

For example, the predetermined input 390 can include pressing a specific key five times in a row. While pressing the key once by accident is extremely likely, pressing the same key five times in a row is highly unlikely. In another example, the predetermined input 390 can include a predetermined sequence of gestures that the user can enter on the touch-sensitive screen of the UE 305. The predetermined sequence of gestures can include creating a gesture X and a gesture O on the phone in a predetermined sequence such as XOXXO. In a third example, the predetermined input 390 can include a voice command such as a safe word or words. The safe words include "please don't hurt me." In a fourth example, the predetermined input 390 can include holding one or more specified keys for a predetermined amount of time, such as eight seconds. As can be seen from the above examples, the predetermined input 390 is unlikely to be dialed by accident.

To notify the operator that the call is an open-line call, the system 300 can use a modified session initiation protocol (SIP) approach. A SIP call has two distinct stages or phases: a call setup phase 330 and a data transfer phase 340. The call setup phase 330 involves organizing the details that get the UE 305 and the operator 320 to connect. The call setup phase 330 includes exchanging messages between the UE 305 and the operator 320 such as SIP header 360 messages. The SIP header 360 can include an optional tag called additional identity tag 370, included in 3GPP TS 24.229 version 16.7.0. The system 300 can include in the additional identity tag 370 an indication that the call is the open-line call.

For example, once the UE 305 detects the predetermined gestures, the UE can include the additional identity tag 370 in the SIP header 360 sent to the network 100. The network 100 upon detecting the SIP header 360 can notify the operator 320 that the call is the open-line call.

The system 300 can determine the location of the UE 305 by, for example, triangulating the position of the UE using the network 100, using Wi-Fi triangulation, or using global positioning system (GPS). Depending on the method used to determine the location of the UE 305, the accuracy of the location can be within 1 km, which is not sufficient to pinpoint the location of the user. To increase the accuracy of the location, the system 300 can retrieve from a database 380 a list of locations associated with previous open-line calls. Based on the triangulated location, and the list of locations obtained from the database 380, the system can determine the most likely location of the open-line call. For example, the system can determine the closest location contained in the database 380 to the triangulated location. Upon determining the location, the system 300 can dispatch assistance to the determined location.

Figure 4:
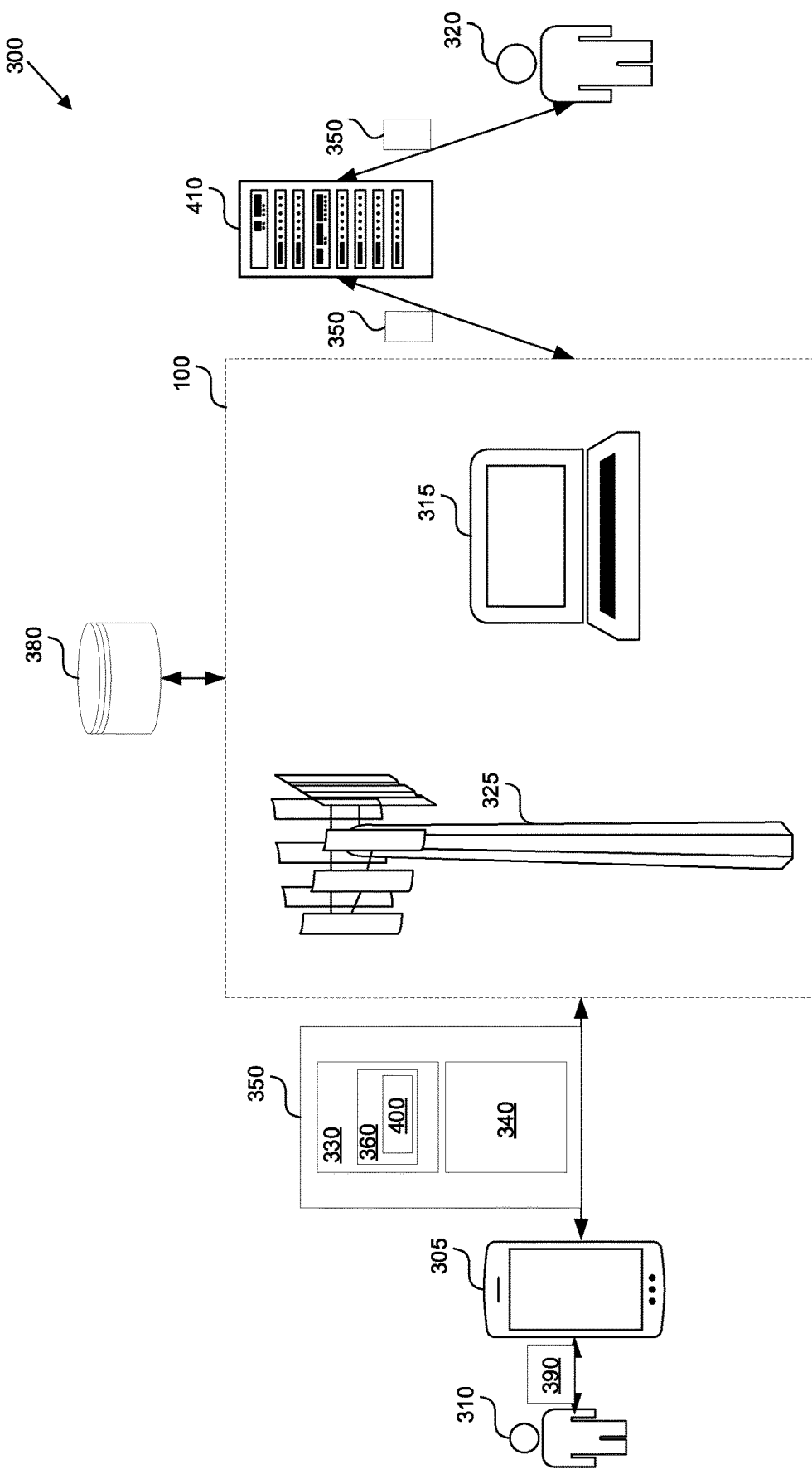
FIG. 4 shows a system to automatically identify an open-line call using a URL.

FIG. 4 shows a system to automatically identify an open-line call using a uniform resource locator (URL). In addition to, or instead of, using the additional identity tag 370 in FIG. 3, the system 300 can include in the SIP call ("call") 350 a URL associated with open-line calls. The URL 400 can be a field associated with the SIP call 350, and can be part of the header 360. The URL can indicate a resource receiving the call 350. The network 100 can forward the call 350 to the resource 410 indicated by the URL 400. The resource 410 can be an Internet server.

The network 100 only forwards the calls including the URL 400 to the resource 410. Consequently, the resource 410 only services open-line calls. When the resource 410 receives the open-line call 350, the operator 320 can be automatically notified that the call 350 is the open-line call and that the operator should not engage in audio communication with the user 310.

A SIP URL 400 address is written in user@domain.tld format in a similar fashion to an email address. A SIP URL 400 address is text, much like an e-mail address, that may contain non-numeric characters. An address like:

sip: 1-999-123-4567@voip-provider.example.net instructs a SIP client to use the Name Authority Pointer (NAPTR) and Service (SRV) record schemes to look up the SIP server associated with the DNS name voip-provider.example.net and connect to that server. If those records are not found, but the name is associated with an IP address, the client will directly contact the SIP server at that IP address on port 5060, by default using the User Datagram Protocol (UDP) transport protocol. UDP is a communication protocol used across the Internet for especially time-sensitive transmissions. It will ask the server (which may be a gateway) to be connected to the destination user at 1-999-123-4567. The gateway may require the user to register using SIP before placing this call. If a destination port is provided as part of the SIP URL, the NAPTR/SRV lookups are not used; rather, the client directly connects to the specified host and port.

Figure 5:
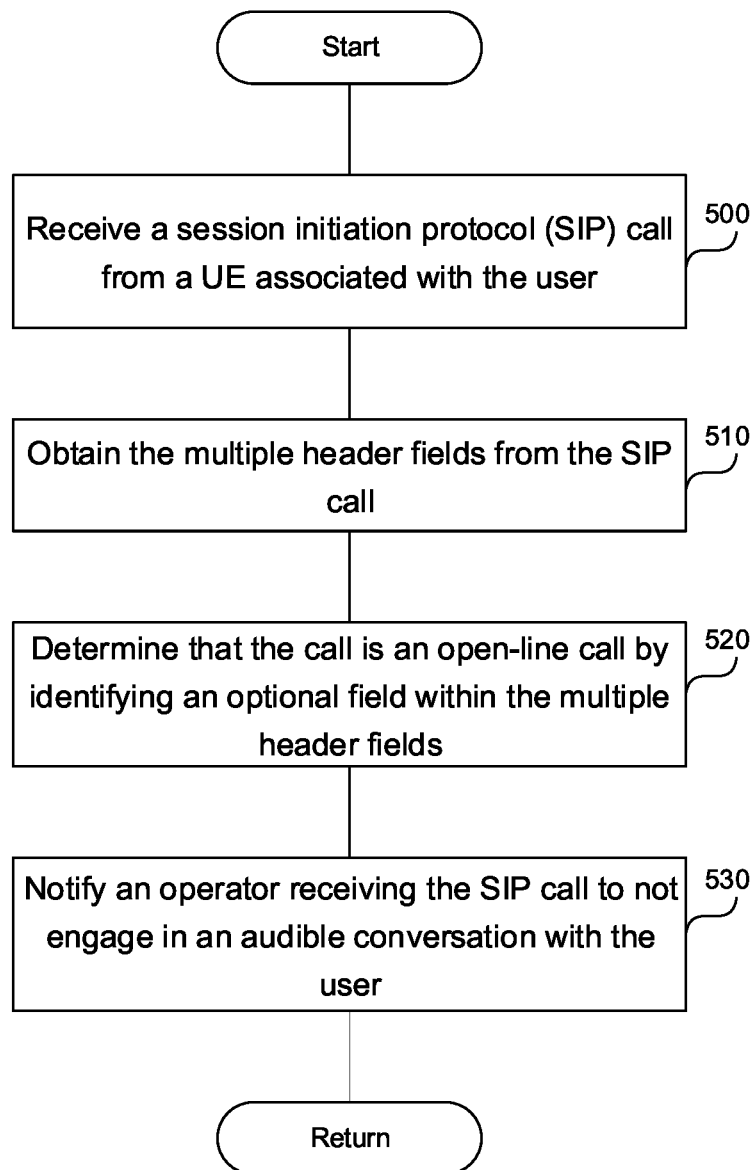
FIG. 5 is a flowchart of a method to automatically identify a call associated with a wireless telecommunication network as an open-line call.

FIG. 5 is a flowchart of a method to automatically identify a call associated with a wireless telecommunication network as an open-line call. A hardware or software processor executing instructions described in this application can, in step 500, receive a session initiation protocol (SIP) call from a UE associated with the user. The SIP call includes a call setup phase and a data transfer phase. The call setup phase precedes the data transfer phase. The call setup phase includes an exchange of multiple header fields.

In step 510, the processor can obtain the multiple header fields from the SIP call. In step 520, the processor can determine that the call is an open-line call by identifying an optional field within the multiple header fields. The optional field can be the additional-identity field defined in 3GPP technical specification (TS) 24.229 version 16.7.0. The optional field indicates that the call is the open-line call. The open-line call indicates that the user of the UE cannot engage in a conversation with a receiver of the open-line call because the user of the UE is a victim of an external threat by an aggressor such as robbery, domestic abuse, etc. In step 530, upon determining that the call is the open-line call, the processor can notify an operator receiving the SIP call to not engage in an audible conversation with the user.

Upon determining that the call is the open-line call, the processor can determine a geographical location associated with the UE. The processor can locate the UE using cell tower triangulation, Wi-Fi triangulation, and/or GPS triangulation. Upon determining that the call is the open-line call, the processor can send a notification to dispatch assistance to the geographical location associated with the UE.

The UE can receive a predetermined input from the user indicating that the call is an open-line call. The UE can present to the user multiple predetermined inputs indicating that the call is the open-line call. An input among the multiple predetermined inputs is configured to be unlikely to be dialed by accident. For example, the multiple predetermined inputs can include a predetermined press of one or more buttons, a predetermined gesture, a voice command, and/or holding one or more buttons for a predetermined amount of time. The UE can request the user to select at least one of the multiple predetermined inputs. The UE can receive a selection from the user, and can store the selection. The UE can receive an input from the user, and detect that the input from the user matches the selection from the user. Upon detecting the input from the user matching the selection from the user, the UE can modify the optional field within the multiple header fields to indicate that the call is the open-line call.

Upon determining that the call is the open line call, the UE can turn on the camera, without turning on the screen of the phone, and can live stream the video and/or audio of the scene. In addition, the UE can automatically turn off the speaker, so that any sound made by the operator is not accidentally made audible by the UE.

The UE can check whether the phone number or address is a known location for prior domestic abuse calls. Upon determining that the call is the open-line call, the UE can determine a likelihood that the call is a false open-line call. For example, the UE can obtain an identifier associated with the UE including a phone number or an address. The UE can determine whether the identifier is stored in a database including multiple open-line call identifiers, where each open-line call identifier among the multiple open-line call identifiers is associated with a previously identified open-line call. In other words, the database can store the phone number and/or address of the location known for prior open-line calls. Upon determining that the identifier is stored in the database, the processor can decrease the likelihood that the call is a false open-line call. The processor can obtain a likelihood threshold. The processor can determine whether the call is the open-line call by comparing the likelihood that the call is a false open-line call to the likelihood threshold. Upon determining that the call is not the open-line call, the processor can refrain from sending the notification to dispatch assistance. If the call is the open-line call, the processor can proceed to send the notification.

For example, the likelihood threshold can be 0.5, on a scale from 0 to 1. If the processor determines that the likelihood of the call being a false open-line call is equal to 0.6, the processor can determine that the call is a false open-line call. In another example, if the processor determines that the likelihood of the call being a false open-line call is equal to 0.2, the processor can determine that the call is a true open-line call.

The processor can determine whether an input from the user indicates that the user desires to place an open-line call. The processor can receive a predetermined input from the user indicating that the call is the open-line call. The input is configured to be unlikely to be dialed by accident because the input involves one or more low-probability inputs occurring, or a long time duration of a high-probability input. The predetermined input can include at least two of: a predetermined press of one or more buttons, a predetermined gesture, a voice command, and holding one or more buttons for a predetermined amount of time. The processor can modify the optional field within the multiple header fields to indicate that the call is the open-line call.

In one embodiment, upon determining that the call is the open-line call, the processor can determine a likelihood that the call is a false open-line call. The processor can obtain an ambient sound recorded by the UE associated with the user. The processor can detect a sign of danger by analyzing the ambient sound to detect a scream, a shout, a threat, a sound of an object falling, or a sound of an object breaking. Upon detecting the sign of danger, the processor can decrease the likelihood that the call is the false open-line call. The processor can obtain a likelihood threshold. The processor can determine whether the call is the open-line call by comparing the likelihood that the call is a false open-line call to the likelihood threshold. Upon determining that the call is the open-line call, the processor can send the notification to dispatch assistance. If the call is a true open-line call, the processor can send the notification to the operator.

In another embodiment, the processor can determine the likelihood that the call is a false open-line call by determining whether people are speaking calmly and conversationally. The processor can obtain an ambient sound recorded by the UE associated with the user. The processor can analyze the ambient sound to determine a pace of a person's speech and a volume of a person's speech. Based on the pace of the person's speech and the volume of the person's speech, the processor can determine whether the person is speaking calmly and conversationally. Upon determining that the person is speaking calmly and conversationally, the processor can increase the likelihood that the call is the false open-line call. The processor can obtain a likelihood threshold. The processor can determine whether the call is the open-line call by comparing the likelihood that the call is a false open-line call to the likelihood threshold. Upon determining that the call is not the open-line call, the processor can refrain from sending the notification to dispatch assistance. If the call is the open-line call, the processor can send the notification to the operator.

In a third embodiment, the processor can determine the likelihood that the call is a false open-line call by detecting in the ambient sound, sounds suggesting that a cell phone is bumping against objects in a carrier such as a pocket, purse, briefcase, or backpack. The processor can obtain an ambient sound recorded by the UE associated with the user. The processor can analyze the ambient sound to detect sounds indicating that the UE is bumping against objects in the carrier. Upon detecting the sounds indicating that the UE is bumping against objects in the carrier, the processor can increase the likelihood that the call is the false open-line call. The processor can obtain a likelihood threshold. The processor can determine whether the call is the open-line call by comparing the likelihood that the call is a false open-line call to the likelihood threshold. Upon determining that the call is not the open-line call, the processor can refrain from sending the notification to dispatch assistance. If the call is the open-line call, the processor can send a notification to the operator.

In addition to, or instead of, using the additional identity tag in the SIP header, the processor can use a custom SIP URL that corresponds to open-line calls. If an operator receives a call from the URL, the processor can notify the operator that the call is the open-line call. The processor can receive the SIP call from the UE associated with the user, where the SIP call includes a URL identifying a receiving device associated with the SIP call. The URL can indicate that the call is an open-line call. The processor can obtain the URL from the SIP call. The processor can route the call to the receiving device identified by the URL. The processor can notify an operator receiving the SIP call from the URL that the call is the open-line call.

Inaudibly Notifying a Caller of a Status of an Open-Line Call

Figure 6:
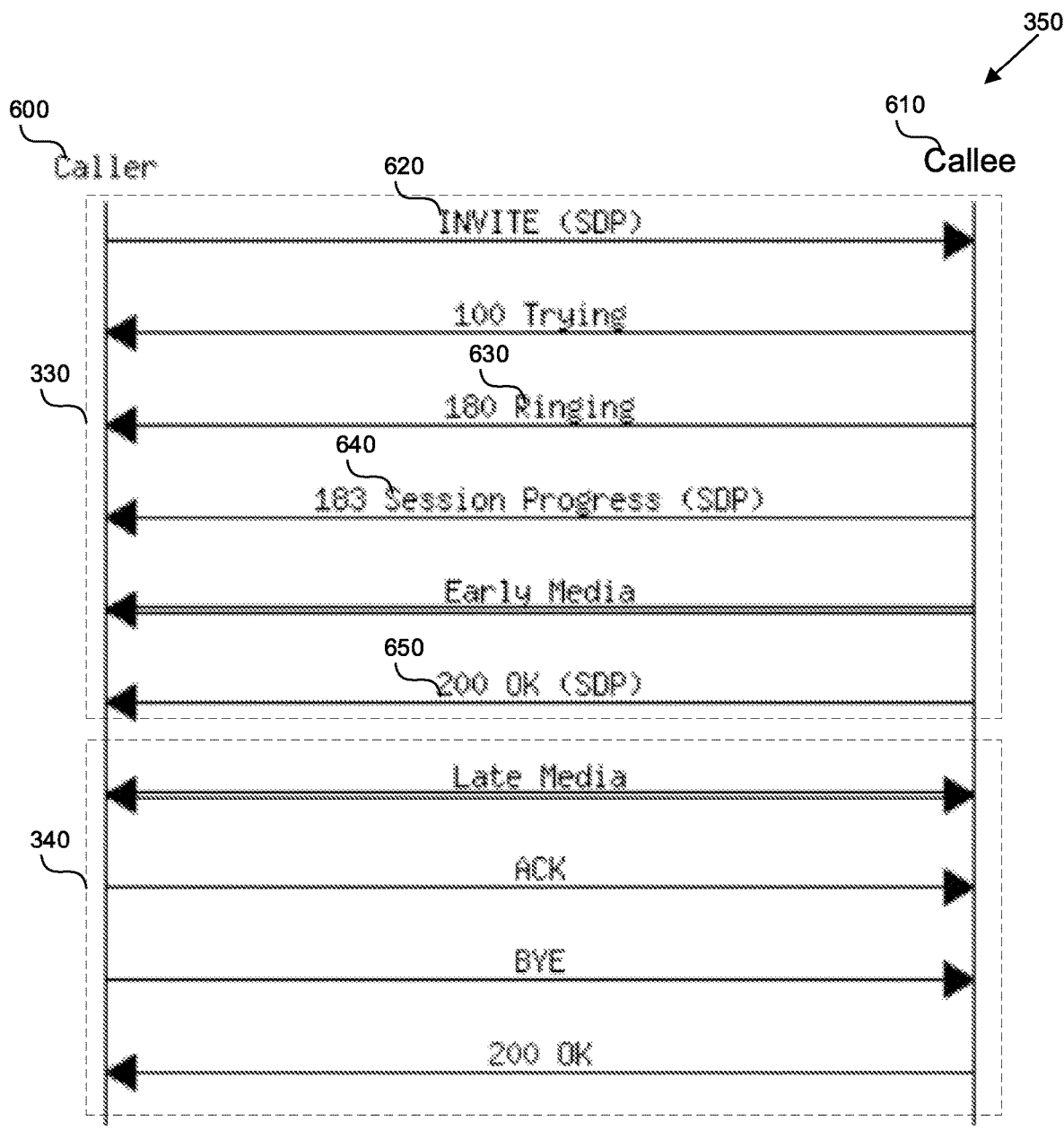
FIG. 6 shows a sequence of messages exchanged in an open-line SIP call.

FIG. 6 shows a sequence of messages exchanged in an open-line SIP call. As explained above, a SIP call 350 has two distinct stages or phases: a call setup phase 330 and a data transfer phase 340. The call setup phase 330 involves organizing the details enabling the caller 600 and the callee 610 to connect. The caller 600 can be the UE 305 in FIGS. 3, 4. The callee 610 can be a UE associated with the operator 320 in FIGS. 3, 4. The callee 610 can be associated with a first responder, or an AI analyzing the incoming call for signs of distress.

The SIP call 350 can be an open-line call. As explained above, the open-line call indicates that communication with the caller 600 needs to be inaudible. Consequently, ringing, talking, or audibly notifying the caller 600 of the status of the SIP call 350 should be avoided.

To initiate the call, the caller 600 sends an INVITE message 620 containing Session Description Protocol (SDP) to the callee 610. SDP is a format for describing multimedia communication sessions for the purposes of announcement and invitation.

The callee 610 can reply with a SIP message 180, labeled 630 in FIG. 6, indicating that the callee 610 has notified the operator 320 of the SIP call 350. The notification can include ringing, vibrating, flashing, sending a message to the operator 320, or other ways to attract the attention of the operator 320. Most of the time, the SIP message 180 response does not carry SDP body, and the caller 600 receiving this response can initiate a local ringback to the end user.

In addition to, or instead of, the SIP message 180, the callee 610 can reply with a SIP message 183, labeled 640 in FIG. 6, indicating that the callee 610 has notified the operator 320 of the SIP call 350. The SIP message 183 can be used to convey the information about the call 350. The SIP message 183 can include header fields or SDP body.

The network 100 in FIG. 1 can modify the SIP message 180 or preferably the SIP message 183 to indicate to the caller 600 to not generate a ringback to the end user, and instead generate a predetermined inaudible notification. The predetermined inaudible notification can include one or more vibrations, a flashing of the screen, a predetermined message displayed, etc.

Alternatively, the caller 600, upon receiving the SIP message 180, or preferably the SIP message 183, and receiving an indication to place the open-line call, can avoid generating a ringback to the user 310 in FIGS. 3, 4. Instead, the caller 600 can generate a predetermined inaudible notification. The caller 600 and the user 310 can establish the predetermined inaudible notification prior to placement of the call 350. The predetermined inaudible notification can include one or more vibrations, a flashing of the screen, a predetermined message displayed, etc.

After the callee 610 responds to the SIP call 350, the callee 610 can send a SIP message 200, labeled 650 in FIG. 6, indicating that the callee 610 has taken the SIP call 350. The SIP message 200 concludes the call setup phase 330 of the SIP call 350, and indicates that communication between the caller 600 and the callee 610 can start. However, during the open-line call, the callee 610 does not want to generate any audible conversation. Consequently, the network 100 can modify the SIP message 200 to indicate to the callee 610 to generate a predetermined inaudible notification to the user 310. The predetermined inaudible notification is different from the predetermined inaudible notification associated with SIP messages 180, 183 so that the user 310 can distinguish between the various statuses of the call 350. The inaudible notification can include vibrating twice, a different number of vibrations than vibrations associated with SIP messages 180, 183, or vibrations for a longer amount of time than vibrations associated with SIP messages 180, 183. The inaudible notification can include flashing the screen, or sending a message that displays on the screen.

In the data transfer phase 340, the callee 610 can analyze the ambient sounds received from the caller 600 to determine whether the caller needs assistance.

In addition to, or instead of, the SIP messages 180, 183, 200, the caller 600 and the callee 610 can communicate using optional tags that are part of the SIP protocol. In that case, both the caller 600 and the callee 610 need to be configured to use the same optional tags.

Figure 7:
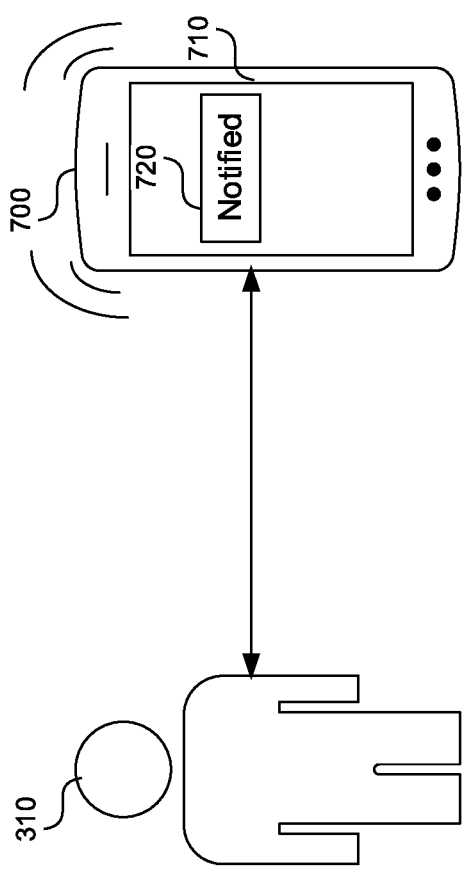
FIG. 7 shows the configuration of the predetermined inaudible notification between a user and a UE.

FIG. 7 shows the configuration of the predetermined inaudible notification between a user and a UE. The UE 700 can inform the user 310 of which inaudible notifications indicate what status of the call. In addition, the UE 700 can demonstrate to the user the particular notification. For example, the UE 700 can display on the screen 710 a notification stating "an operator has been notified of the open-line call" and can provide an inaudible notification, such as vibrating once. In another example, the UE 700 can display on the screen 710 a notification stating "the operator has answered the open-line call" and can provide an inaudible notification, such as vibrating twice.

Alternatively, the UE 700 can enable the user to select between different notifications. For example, the UE 700 can enable the user to select between displaying a message 720 "notified" indicating that the operator has been notified of the call, or vibrating once. In another example, the UE 700 can ask the user to select between displaying a message "answered" indicating that the operator has answered the call, or vibrating twice.

The UE 700 can enable the user to configure the particular notifications. For example, if the user cannot feel the vibration, the user can adjust the intensity of the vibration. The user can also adjust the duration of the vibration. The duration of the vibration can distinguish between a placed call notification and an answered call notification. Instead of vibration, the user can also select different notifications, such as screen flashing, or messages displayed on the screen.

Figure 8:
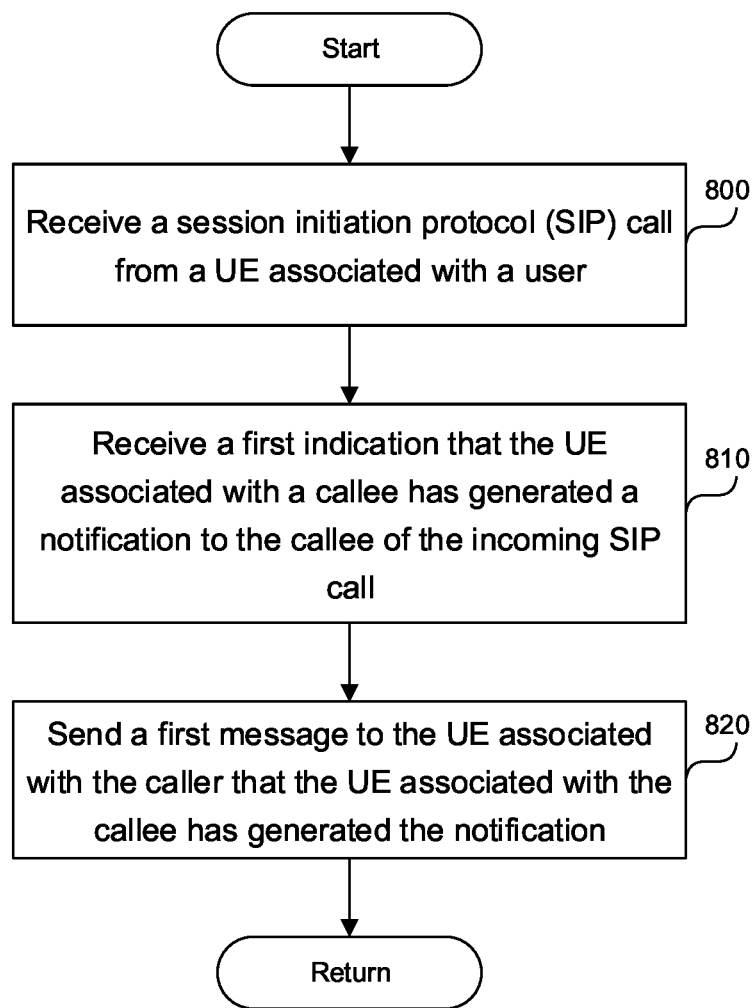
FIG. 8 is a flowchart of a method to inaudibly notify a caller of a status of an open-line call.

FIG. 8 is a flowchart of a method to inaudibly notify a caller of a status of an open-line call. A hardware or software processor executing instructions described in this application can, in step 800, receive a session initiation protocol (SIP) call from a UE associated with a user. The SIP call includes multiple fields, where a field among the multiple fields indicates that the SIP call is the open-line call. The SIP call includes a setup phase and a data transfer phase. The setup phase precedes the data transfer phase, and includes an exchange of multiple fields.

In step 810, the processor can receive a first indication that the UE associated with a callee has generated a notification to the callee of the SIP call. The first indication can include a SIP message 180 or a SIP message 183.

In step 820, upon identifying the SIP call as the open-line call and receiving the first indication, the processor can send a first message to the UE associated with the caller that the UE associated with the callee has generated the notification. The first message indicates to the UE associated with the caller to generate a first inaudible notification indicating that the UE associated with the callee generated the notification.

The first inaudible notification can include one or more vibrations, a flashing of the screen, or a message displayed on the screen.

To send the first message, the processor can modify the SIP message 180 or the SIP message 183 to indicate to the UE associated with the caller to generate a silent notification to the caller that the UE associated with the callee generated the notification, e.g., that the UE associated with the callee is ringing. The processor can send the modified SIP message 180 or SIP message 183 to the UE associated with the caller. Alternatively, the processor can add an additional tag to the multiple SIP fields, where the additional tag indicates to the UE associated with the caller that the UE associated with the callee generated the notification.

The processor can receive a second indication that the callee has answered the SIP call. The second indication can include a SIP message 200. Upon identifying the SIP call as the open-line call and receiving the second indication, the processor can send a second message to the UE associated with the caller that the callee has answered the SIP call. The second message can indicate to the UE associated with the caller to generate a second inaudible notification indicating that the callee has answered the SIP call. The first inaudible notification and the second inaudible notification are different. For example, the first inaudible notification can be a single vibration, while the second inaudible notification can be two vibrations. Alternatively, the first inaudible notification can be a brief vibration for up to 3 seconds, while the second inaudible notification can be a longer vibration lasting up to 10 seconds.

To send the second message, the processor can modify a SIP message 200 to the UE associated with the caller to generate a second inaudible notification to the caller that the callee has answered the SIP call. The SIP message 200 can conclude the setup phase.

Upon determining that the SIP call is the open-line call, the processor can determine a geographical location of the UE associated with the caller. Upon determining that the SIP call is the open-line call, the processor can send a notification to dispatch assistance to the geographical location associated with the UE. Upon sending notification to dispatch assistance, the processor can send a message to the UE associated with the caller to generate a third inaudible notification to the caller that the assistance is being dispatched. The third inaudible notification is different from the first inaudible notification and from the second inaudible notification. For example, the third inaudible notification can include three vibrations as opposed to two or one vibration associated with the second and first inaudible notification, respectively.

Upon determining that the SIP call is the open-line call, the processor can determine a likelihood that the SIP call is a false open-line call. In one embodiment, the processor can obtain an identifier associated with the UE, where the identifier includes a phone number, an address, an International Mobile Equipment Identity (IMEI), etc. The processor can determine whether the identifier is stored in a database including multiple open-line call identifiers, where each open-line call identifier among the multiple open-line call identifiers is associated with a previously identified open-line call. Upon determining that the identifier is stored in the database, the processor can decrease the likelihood that the SIP call is the false open-line call. The processor can obtain a likelihood threshold. The processor can determine whether the SIP call is the open-line call by comparing the likelihood that the SIP call is the false open-line call to the likelihood threshold. Upon determining that the SIP call is not the open-line call, refrain from sending the notification to dispatch assistance.

For example, the likelihood threshold can be 0.7, on a scale from 0 to 1. If the processor determines that the likelihood that the call is a false open-line call equals to 0.81, the processor can determine that the call is a false open-line call. In another example, the processor determines that the likelihood that the call is a false open-line call equals to 0.5, the processor can determine that the call is a true open-line call.

In another embodiment, the processor can obtain an ambient sound recorded by the UE associated with the user. The processor can analyze the ambient sound to determine a pace of person's speech and a volume of person's speech. Based on the pace of person's speech and the volume of person's speech, the processor can determine whether a person is speaking calmly and conversationally. Upon determining that the person is speaking calmly and conversationally, the processor can increase the likelihood that the SIP call is the false open-line call. The processor can obtain a likelihood threshold. The processor can determine whether the SIP call is the open-line call by comparing the likelihood that the SIP call is the false open-line call to the likelihood threshold. Upon determining that the SIP call is not the open-line call, the processor can refrain from sending the notification to dispatch assistance.

In a third embodiment, the processor can obtain an ambient sound recorded by the UE associated with the user. The processor can analyze the ambient sound to detect sounds indicating that the UE is bumping against objects in a carrier. Upon detecting the sounds indicating that the UE is bumping against objects in the carrier, the processor can increase the likelihood that the SIP call is the false open-line call. The processor can obtain a likelihood threshold. The processor can determine whether the SIP call is the open-line call by comparing the likelihood that the SIP call is the false open-line call to the likelihood threshold. Upon determining that the SIP call is not the open-line call, the processor can refrain from sending the notification to dispatch assistance.

Computer System

Figure 9:
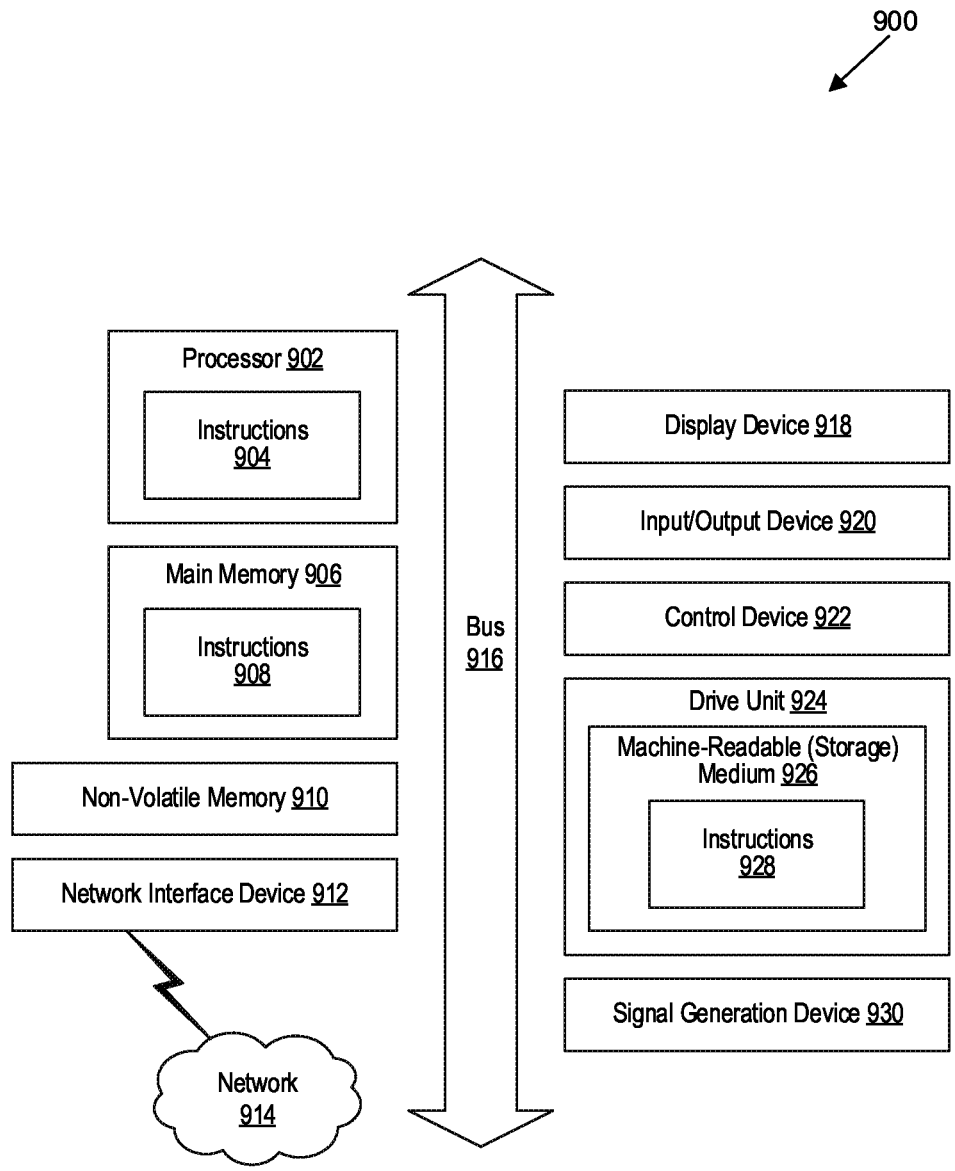
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the Figures and any other components described in this specification can be implemented.

The computer system 900 can take any suitable physical form. For example, the computer system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one computer-readable storage medium, excluding transitory signals and carrying instructions to inaudibly notify a caller of a status of an open-line call, which, when executed by at least one data processor of a system, cause the system to:
   receive a session initiation protocol (SIP) call from a mobile device associated with the caller,
      wherein the SIP call includes a setup phase and a data transfer phase,
      wherein the setup phase precedes the data transfer phase,
      wherein the setup phase includes an exchange of multiple fields, and,
      wherein a field among the multiple fields indicates that the SIP call is the open-line call;
   receive a first indication that a device associated with the callee has generated a notification to the callee of the SIP call;
   upon identifying the SIP call as the open-line call and receiving the first indication, send a first message to the mobile device associated with the caller that the device associated with the callee has generated the notification,
      wherein the first message indicates to the mobile device associated with the caller to generate a first inaudible notification indicating that the device associated with the callee generated the notification;
   receive a second indication that the callee has answered the SIP call; and
   upon identifying the SIP call as the open-line call and receiving the second indication, send a second message to the mobile device associated with the caller indicating that the callee has answered the SIP call,
      wherein the second message indicates to the mobile device associated with the caller to generate a second inaudible notification indicating that the callee has answered the SIP call, and,
      wherein the first inaudible notification and the second inaudible notification are different.

2. The computer-readable storage medium of claim 1, comprising instructions to:
   upon determining that the SIP call is the open-line call, determine a geographical location of the mobile device associated with the caller;
   upon determining that the SIP call is the open-line call, send a notification to dispatch assistance to the geographical location associated with the mobile device; and
   upon sending the notification to dispatch the assistance, send a message to the mobile device associated with the caller to generate a third inaudible notification to the caller that the assistance is being dispatched,
      wherein the third inaudible notification is different from the first inaudible notification and from the second inaudible notification.

3. The computer-readable storage medium of claim 1, instructions to send the first message comprising instructions to:
   modify a SIP message 180 or a SIP message 183 to indicate to the mobile device associated with the caller to generate a tactile notification to the caller that the device associated with a callee generated the notification,
      wherein the tactile notification includes vibrating once,
      wherein the SIP message 180 or the SIP message 183 occur during the setup phase; and
   send the SIP message 180 or the SIP message 183 to the mobile device associated with the caller.

4. The computer-readable storage medium of claim 1, instructions to send the second message comprising instructions to:
   modify a SIP message 200 to the mobile device associated with the caller to generate a tactile notification to the caller that the callee has answered the SIP call,
      wherein the tactile notification includes vibrating more than once,
      wherein the SIP message 200 includes the setup phase; and
   send the SIP message 200 to the mobile device associated with the caller.

5. The computer-readable storage medium of claim 1, comprising instructions to:
   upon determining that the SIP call is the open-line call, determine a likelihood that the SIP call is a false open-line call by:
      obtaining an identifier associated with the mobile device,
         wherein the identifier includes a phone number or an address;
      determining whether the identifier is stored in a database including multiple open-line call identifiers,
         wherein each open-line call identifier among the multiple open-line call identifiers is associated with a previously identified open-line call;
      upon determining that the identifier is stored in the database, decreasing the likelihood that the SIP call is the false open-line call;
   obtain a likelihood threshold;
   determine whether the SIP call is the open-line call by comparing the likelihood that the SIP call is the false open-line call to the likelihood threshold; and
   upon determining that the SIP call is not the open-line call, refrain from sending the notification to dispatch assistance.

6. The computer-readable storage medium of claim 1, comprising instructions to:
upon determining that the SIP call is the open-line call, determine a likelihood that the SIP call is a false open-line call by:
obtaining an ambient sound recorded by the device associated with a callee;
analyzing the ambient sound to determine a pace of a person's speech and a volume of a person's speech;
based on the pace of the person's speech and the volume of the person's speech, determining whether the person is speaking calmly and conversationally;
upon determining that the person is speaking calmly and conversationally, increasing the likelihood that the SIP call is the false open-line call;
determine whether the SIP call is the open-line call by comparing the likelihood that the SIP call is the false open-line call to a likelihood threshold; and
upon determining that the SIP call is not the open-line call, refrain from sending the notification to dispatch assistance.

7. The computer-readable storage medium of claim 1, comprising instructions to:
upon determining that the SIP call is the open-line call, determine a likelihood that the SIP call is a false open-line call by:
obtaining an ambient sound recorded by the device associated with a callee;
analyzing the ambient sound to detect sounds indicating that the mobile device is bumping against objects in a carrier;
upon detecting the sounds indicating that the mobile device is bumping against objects in the carrier, increasing the likelihood that the SIP call is the false open-line call;
determine whether the SIP call is the open-line call by comparing the likelihood that the SIP call is the false open-line call to a likelihood threshold; and
upon determining that the SIP call is not the open-line call, refrain from sending the notification to dispatch assistance.

8. A system comprising:
at least one hardware processor; and
at least one non-transitory memory storing instructions, which, when executed by the at least one hardware processor, cause the system to:
receive at a UE of a callee, a session initiation protocol (SIP) call from a UE associated with a caller, wherein the SIP call includes multiple fields, and wherein a field among the multiple fields indicates that the SIP call is an open-line call;
receive a first indication that the UE associated with the callee has generated a notification to the callee;
upon identifying the SIP call as the open-line call and receiving the first indication, send a first message to a UE associated with the caller that the UE associated with the callee received the SIP call,
wherein the first message indicates to the UE associated with the caller to generate a first inaudible notification indicating that the UE associated with the callee received the SIP call;
receive a second indication that the callee has answered the SIP call; and
upon identifying the SIP call as the open-line call and receiving the second indication, send a second message to the UE associated with the caller that the callee has answered the SIP call,
wherein the second message indicates to the UE associated with the caller to generate a second inaudible notification indicating that the callee has answered the SIP call.

9. The system of claim 8, comprising instructions to:
upon determining that the SIP call is the open-line call, determine a geographical location of the UE associated with the caller;
upon determining that the SIP call is the open-line call, send a notification to dispatch assistance to the geographical location associated with the UE; and
upon sending the notification to dispatch the assistance, send a message to the UE associated with the caller to generate a third inaudible notification to the caller that the assistance is being dispatched.

10. The system of claim 8, instructions to send the first message comprising instructions to:
modify a SIP message 180 or a SIP message 183 to indicate to the UE associated with the caller to generate the first inaudible notification to the caller that the UE associated with the callee generated the notification; and
send the SIP message 180 or the SIP message 183 to the UE associated with the caller.

11. The system of claim 8, comprising instructions to:
receive a second indication that the callee has answered the SIP call;
upon identifying the SIP call as the open-line call and receiving the second indication, send a second message to the UE associated with the caller that the callee has answered the SIP call,
wherein the second message indicates to the UE associated with the caller to generate a second inaudible notification indicating that the callee has answered the SIP call; and
modify a SIP message 200 to the UE associated with the caller to generate the second inaudible notification to the caller that the callee has answered the SIP call.

12. The system of claim 8, comprising instructions to:
upon determining that the SIP call is the open-line call, determine a likelihood that the SIP call is a false open-line call by:
obtaining an identifier associated with the UE associated with the caller, wherein the identifier includes a phone number or an address;
determining whether the identifier is stored in a database including multiple open-line call identifiers, wherein each open-line call identifier among the multiple open-line call identifiers is associated with a previously identified open-line call; and
upon determining that the identifier is stored in the database, decreasing the likelihood that the SIP call is the false open-line call;
determine whether the SIP call is the open-line call by comparing the likelihood that the SIP call is the false open-line call to a likelihood threshold; and
upon determining that the SIP call is not the open-line call, refrain from sending the notification to dispatch assistance.

13. The system of claim 8, comprising instructions to:
upon determining that the SIP call is the open-line call, determine a likelihood that the SIP call is a false open-line call by:
obtaining an ambient sound recorded by the UE associated with the callee;
analyzing the ambient sound to determine a pace of a person's speech and a volume of a person's speech;

based on the pace of the person's speech and the volume of the person's speech, determining whether the person is speaking calmly and conversationally;

upon determining that the person is speaking calmly and conversationally, increasing the likelihood that the SIP call is the false open-line call;

determine whether the SIP call is the open-line call by comparing the likelihood that the SIP call is the false open-line call to the likelihood threshold; and upon determining that the SIP call is not the open-line call, refrain from sending the notification to dispatch assistance.

14. The system of claim 8, comprising instructions to:

upon determining that the SIP call is the open-line call, determine a likelihood that the SIP call is a false open-line call by:

obtaining an ambient sound recorded by the UE associated with the callee;

analyzing the ambient sound to detect sounds indicating that the UE is bumping against objects in a carrier;

upon detecting the sounds indicating that the UE is bumping against objects in the carrier, increasing the likelihood that the SIP call is the false open-line call;

determine whether the SIP call is the open-line call by comparing the likelihood that the SIP call is the false open-line call to a likelihood threshold; and upon determining that the SIP call is not the open-line call, refrain from sending the notification to dispatch assistance.

15. A system comprising:

at least one hardware processor; and at least one non-transitory memory storing instructions, which, when executed by the at least one hardware processor, cause the system to:

at a UE associated with a caller receive a predetermined input from the caller indicating to place an open-line call, wherein the predetermined input is configured to unlikely be dialed by accident, and wherein the predetermined input includes at least two of: a predetermined press of one or more buttons, a predetermined gesture, a voice command, or holding one or more buttons for a predetermined amount of time; and determine whether the SIP call is the open-line call by calculating a likelihood threshold associated with the predetermined input;

place a SIP call indicating that the SIP call is the open-line call;

upon receiving the predetermined input, configure the UE to convert incoming audible notifications to an inaudible notification;

receive a first message indicating that the UE associated with the callee generated a notification of the SIP call to the callee;

based on the first message, generate a first inaudible notification, receive a second message indicating that the callee has answered the SIP call; and based on the second message, generate a second inaudible notification, wherein the second inaudible notification is different from the first inaudible notification.

16. The system of claim 15, instructions to send the first message comprising instructions to:

receive a SIP message 180 or a SIP message 183 indicating that the UE associated with the callee generated the notification; and upon receiving the SIP message 180 or the SIP message 183, generate a predetermined inaudible notification, wherein the predetermined inaudible notification indicates that the UE associated with the callee generated the notification.

17. The system of claim 15, comprising instructions to:

receive a SIP message 200 indicating that the callee has answered the SIP call; and upon receiving the SIP message 200, generate a predetermined inaudible notification, wherein the predetermined inaudible notification indicates that the callee has answered the SIP call.

18. The system of claim 15, comprising instructions to:

receive a SIP message 200 indicating that the callee has answered the SIP call; and upon receiving the SIP message 200, generate a vibration for a predetermined number of times, wherein the vibration for the predetermined number of times indicates that the callee has answered the SIP call.

* * * * *